UNITED STATES PATENT OFFICE.

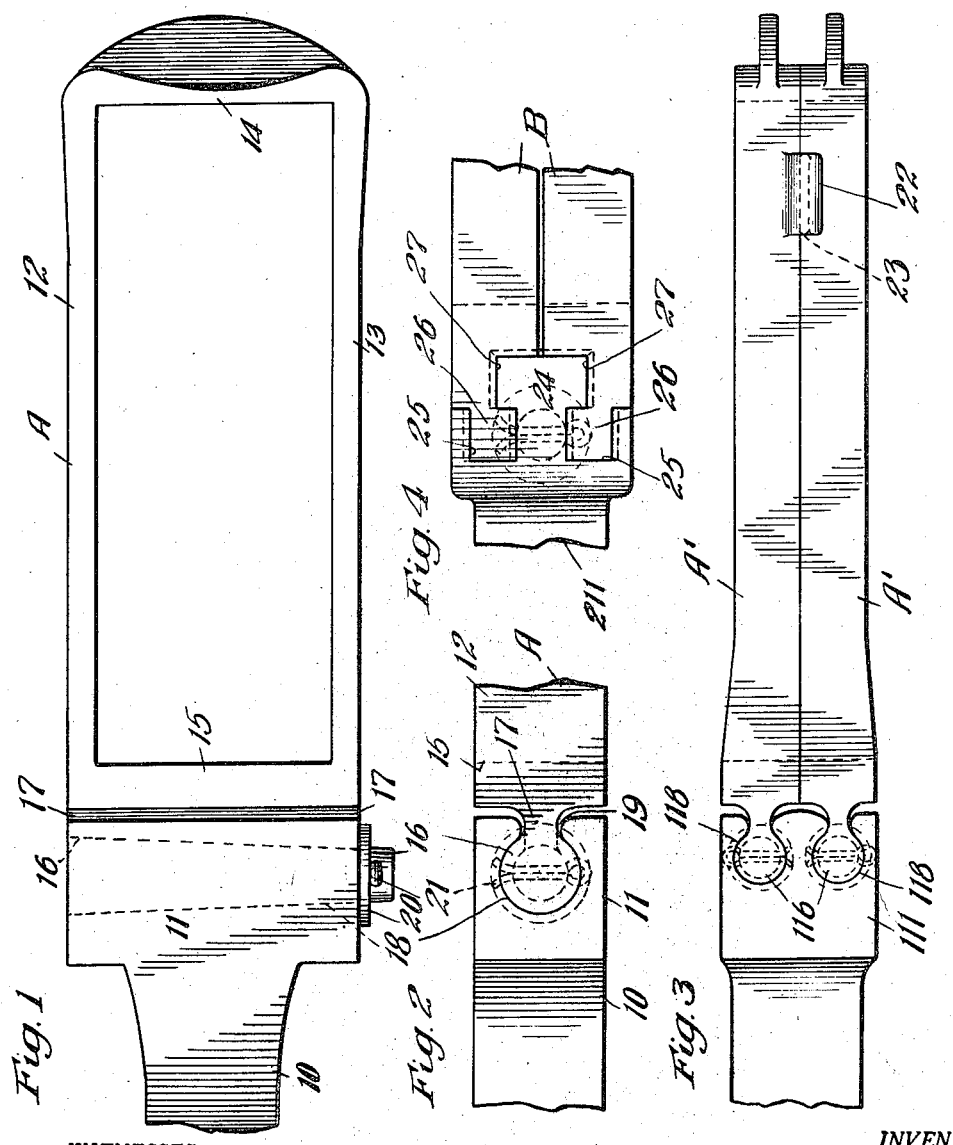

JOHN F. O'CONNOR, OF CHICAGO, ILLINOIS, ASSIGNOR TO WILLIAM H. MINER, OF CHAZY, NEW YORK.

DETACHABLE DRAW-BAR AND YOKE.

1,278,372. Specification of Letters Patent. Patented Sept. 10, 1918.

Application filed July 20, 1916. Serial No. 110,269.

*To all whom it may concern:*

Be it known that I, JOHN F. O'CONNOR, a citizen of the United States, residing at Chicago, in the county of Cook and State of Illinois, have invented a certain new and useful Improvement in Detachable Draw-Bars and Yokes, of which the following is a full, clear, concise, and exact description, reference being had to the accompanying drawings, forming a part of this specification.

This invention relates to improvements in detachable draw bar and yoke.

The object of the invention is to provide a draw bar and yoke so constructed that the draw bar may be readily detached from the yoke while the latter remains in position, the draw bar being disconnected by being merely dropped down.

In the drawing forming a part of this specification, Figure 1 is a side elevation of a portion of a draw bar and a yoke showing my improvements in connection therewith. Fig. 2 is a top plan view of a portion of the structure illustrated in Fig. 1 and showing more particularly the connection between the draw bar and yoke. Fig. 3 is a top plan view of a draw bar and yoke showing a similar type of connection to that illustrated in Figs. 1 and 2, but illustrating the method of adapting the connection to a two-part yoke. Fig. 4 is a view similar to Fig. 2, illustrating a different embodiment of the invention and as applied to a two-part yoke.

Referring to the structure illustrated in Figs. 1 and 2, 10 denotes the shank of a coupler or draw bar having a butt 11, and A designates a yoke. The yoke A comprises upper arm 12, lower arm 13, rear connecting piece 14, and front wall 15. The latter is provided with a forwardly extended pivot member 16 connected to the front wall of the yoke by a narrower neck section 17. The pivot member 16 is tapered from top to bottom and is adapted to fit within and swiveled with respect to a correspondingly tapered recess 18 formed in the butt of the draw bar. Said tapered recess 18 is open at its rear as indicated at 19, the distance across the opening 19 being somewhat greater than the width of the neck section 17 to thereby permit the two members to have relative swinging or radial movement. The pivot member 16 is extended downwardly below the lower arm of the yoke and also below the bottom face of the draw bar butt, to thereby permit the application of a washer 20 which is held in position by a cotter 21.

From the preceding description, it will be seen that the draw bar can be applied to the yoke by merely lifting the draw bar vertically after the yoke is in position, since the taper of the pivot member is so formed as to permit this. In this way, draw bar changes or repairs may be made without disturbing the yoke or the gear.

In the structure illustrated in Fig. 3, the butt 111 of the draw bar is provided with two tapered recesses 118—118 with which coöperate correspondingly tapered pivot members 116—116 formed on the front ends of two parallel, loop shaped yoke members $A^1$ $A^1$. The latter are prevented from lateral separation by overlapping ribs 22 and ribs 23. It is apparent that the draw bar may be assembled on the two-part yoke structure in the same manner as that described for the single yoke structure shown in Figs. 1 and 2.

In the structure illustrated in Fig. 4, the butt 211 of the draw bar is provided with a centrally located T head 24 which is tapered from bottom to top; and two recesses on the sides thereof 25—25, the latter being tapered also from bottom to top. The two yoke members B, B are each provided at their forward ends with an extension key 26 which is adapted to fit within the recess 25, each key 26 being tapered from top to bottom, and to the rear of each key 26, each yoke member B is further provided with a recessed portion 27 to correspond with one half of the tapered T head 24 of the draw bar butt. In this construction also, the parts are assembled by lifting the draw bar into position after the yoke members are in place. It is of course, apparent that the draw bar and yoke in all the constructions may be assembled before the same are placed on the car.

From the preceding description, it will be seen that all the parts may be made by castings and without the necessity of machining, the tapering formation of the pivot members and keys and recesses permitting this. Furthermore, it will be observed that in the construction illustrated in Fig. 3, the two yoke members $A^1$ $A^1$ will serve to automatically center the draw bar when a gear is placed within the yoke, since the latter will always tend to expand and maintain the yoke members in exact alinement, thus causing the draw bar to be maintained parallel to the yoke members.

I claim:

1. The combination with a draw bar and two-part yoke, of means for connecting the draw bar and yoke, said means including vertically extending pivot elements tapered from top to bottom and correspondingly tapered recesses to receive said pivot elements formed on the adjacent ends of said draw bar and parts of the yoke, the draw bar and yoke parts being assembled by lifting the draw bar vertically and slidably engaging the pivot elements with the respective tapered recesses.

2. In a draft rigging, the combination with a draw bar, and a yoke, of means for connecting the draw bar and yoke, said means including a vertically extending, tapered element on the forward end of the yoke, and a tapered recess in the draw bar butt, the taper of the parts being such that the draw bar may be applied to the yoke by lifting the draw bar vertically while the yoke is in position on a car.

3. The combination with a draw bar and yoke, of means for connecting the draw bar and yoke, said means including a vertically extending, pivot element at the end of one of said members, said pivot element being tapered from top to bottom, the butt of the draw bar being provided with a correspondingly tapered recess adapted to receive said pivot element, the draw bar being assembled with the yoke by lifting the draw bar vertically and slidably engaging the pivot element within the tapered recess.

4. The combination with a draw bar and two-part yoke, of means for connecting the draw bar and yoke, said means comprising on each of the yoke parts a tapered pivot member at the forward end, the butt of the draw bar being provided with a pair of tapered openings to receive said pivot members.

In witness that I claim the foregoing I have hereunto subscribed my name this 18th day of July 1916.

JOHN F. O'CONNOR.

Witnesses:
ELIZABETH M. BRITT,
LUCILLE HIGGINS.